US009922769B2

(12) United States Patent
Reinbold

(10) Patent No.: US 9,922,769 B2
(45) Date of Patent: Mar. 20, 2018

(54) THREE-PHASE ELECTRICAL CAN CAPACITOR WITH THREE STAR-CONNECTED CAPACITANCES IN A HOUSING

(75) Inventor: Hans-Georg Reinbold, Sexau (DE)

(73) Assignee: FRAKO KONDENSATOREN- UND ANLAGENBAU GMBH, Teningen (DE)

( * ) Notice: Subject to any disclaimer, the term of this patent is extended or adjusted under 35 U.S.C. 154(b) by 588 days.

(21) Appl. No.: 14/126,574

(22) PCT Filed: May 15, 2012

(86) PCT No.: PCT/EP2012/002084
§ 371 (c)(1),
(2), (4) Date: Dec. 16, 2013

(87) PCT Pub. No.: WO2012/171606
PCT Pub. Date: Dec. 20, 2012

(65) Prior Publication Data
US 2014/0111903 A1   Apr. 24, 2014

(30) Foreign Application Priority Data
Jun. 15, 2011   (DE) .................. 10 2011 104 257

(51) Int. Cl.
*H01G 4/32*   (2006.01)
*H01G 4/08*   (2006.01)
*H01G 4/38*   (2006.01)
*H01G 4/228*  (2006.01)

(52) U.S. Cl.
CPC ............. *H01G 4/32* (2013.01); *H01G 4/38* (2013.01); *H01G 4/385* (2013.01)

(58) Field of Classification Search
CPC .. H01G 4/32; H01G 4/18; H01G 4/38; H01G 4/228
USPC ....... 361/301.5, 531, 328, 323, 306.3, 306.1
See application file for complete search history.

(56) References Cited

U.S. PATENT DOCUMENTS 6,212,058 B1 *   4/2001   Huber .................. H01G 4/38
361/301.3
2003/0103318 A1 *   6/2003   Eriksson ............ H01G 4/015
361/306.3

FOREIGN PATENT DOCUMENTS

DE   102005045978 B3 *   3/2007   .............. H01G 2/18

* cited by examiner

*Primary Examiner* — Eric Thomas
*Assistant Examiner* — Arun Ramaswamy
(74) *Attorney, Agent, or Firm* — Jonathan M. D'Silva; MMI Intellectual Property

(57) ABSTRACT

Three-phase electrical can capacitor with three star-connected capacitances in a housing, characterized in that two polymer film capacitor coils (10, 12), which each have a hollow capacitor coil core (14) and are provided on the end sides with in each case one end contact layer (16, 18 and 20, 22), are arranged one above the other in the form of a column in the housing, wherein one (10) of the two polymer film capacitor coils (10, 12) has one individual capacitance and the other (12) of the two polymer film capacitor coils has two individual capacitances, and all of the individual capacitances are equal in size.

13 Claims, 4 Drawing Sheets

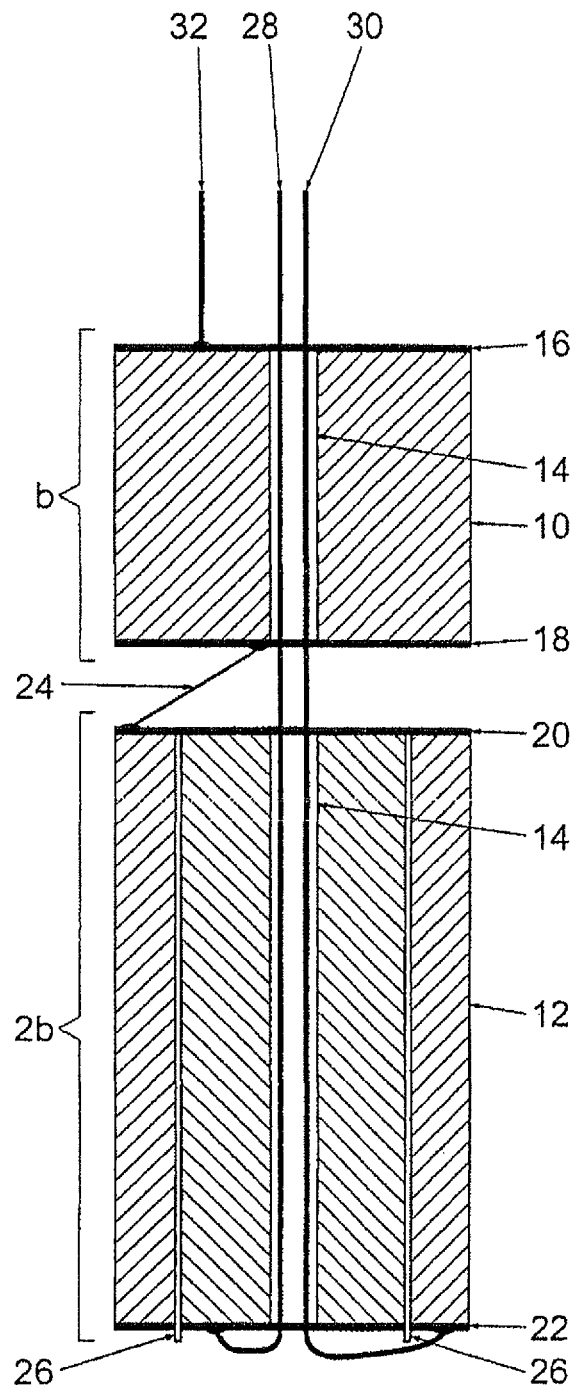
Figur 1

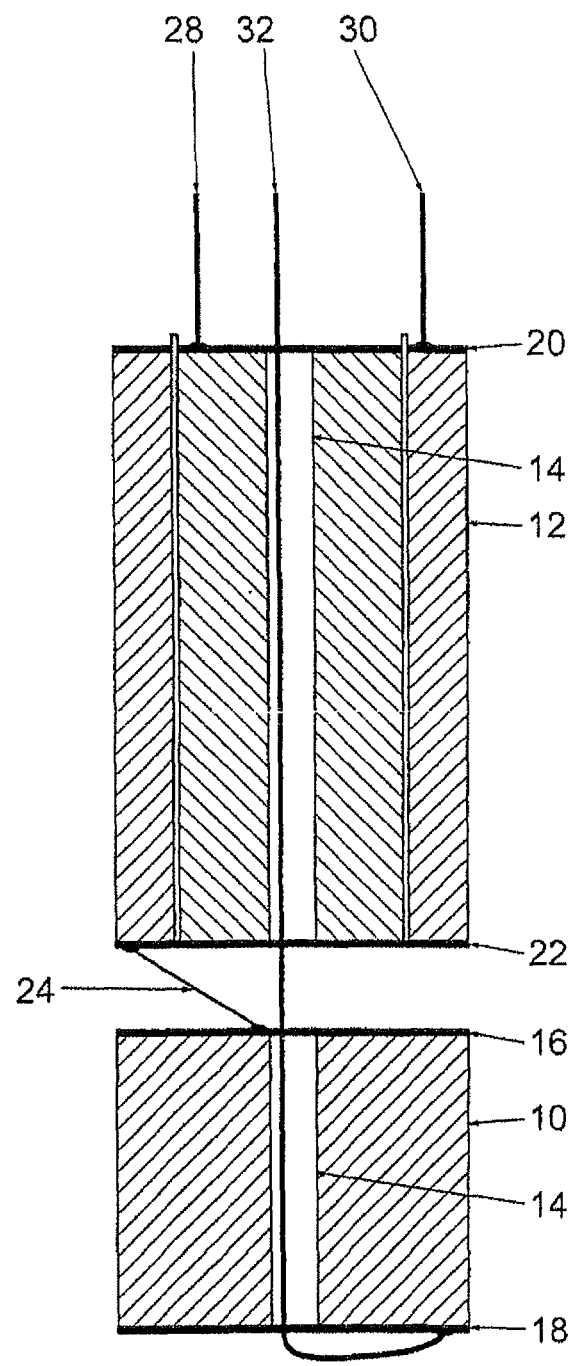
Figur 2

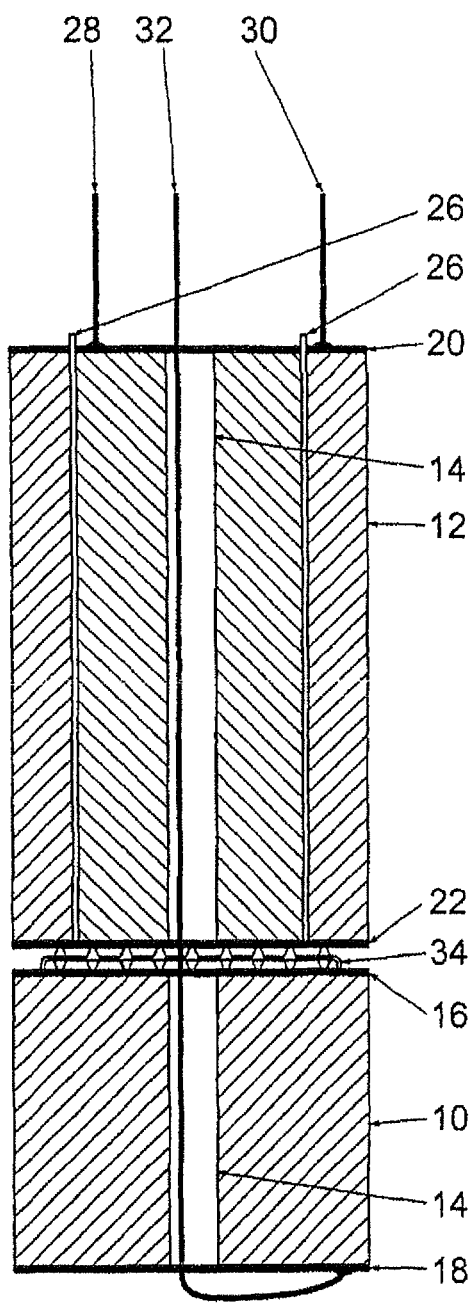
Figur 3

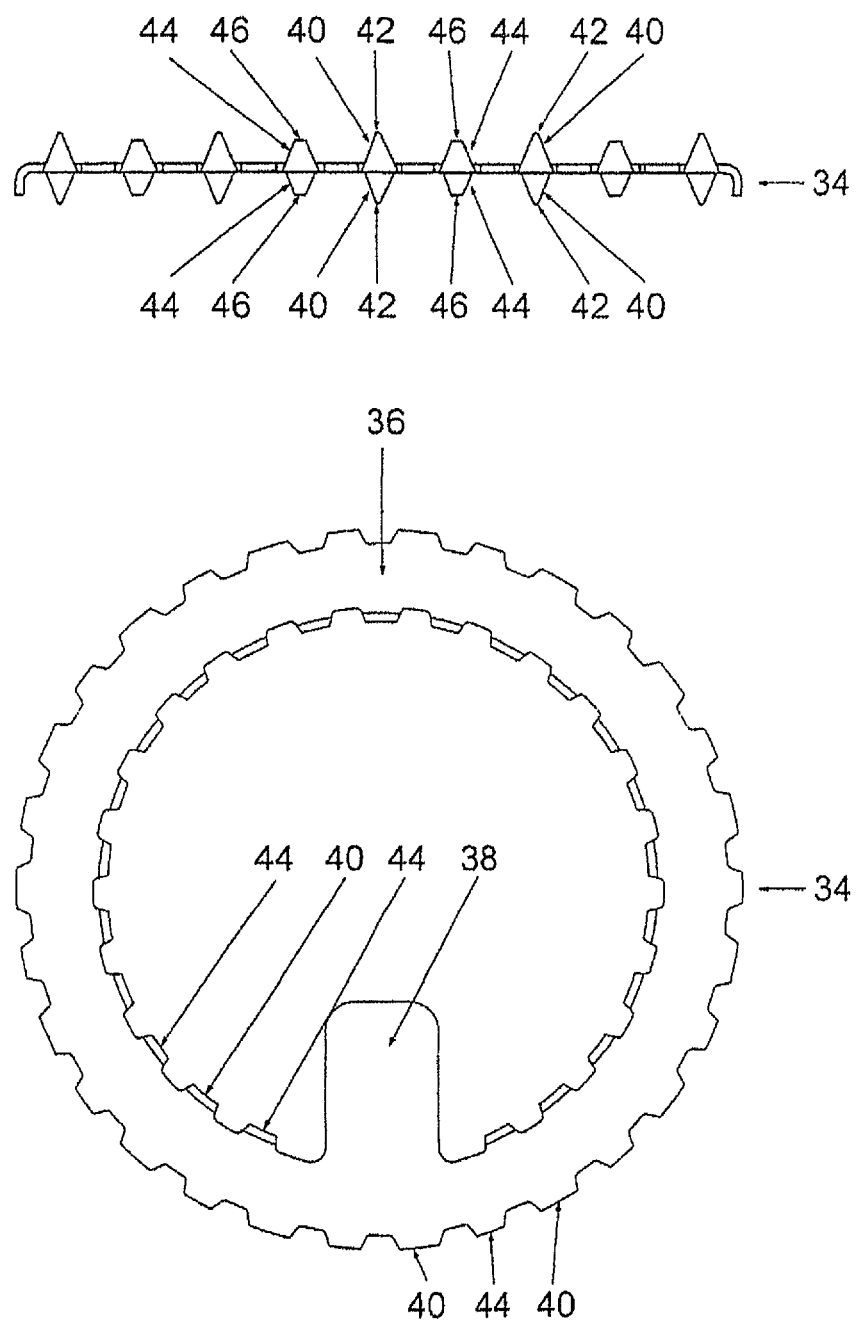
Figur 4

THREE-PHASE ELECTRICAL CAN CAPACITOR WITH THREE STAR-CONNECTED CAPACITANCES IN A HOUSING

The present application is a National Stage application of International Patent Application Number PCT/EP2012/002084 filed Jun. 15, 2011, which claims priority to German Patent Application 102011104255.9, filed May 15, 2012, both of which are incorporated herein by reference.

The present invention relates to a three-phase electrical can capacitor having three star-connected capacitances in one housing.

The conventional structure of power capacitors in three-phase networks in the form of three-phase electrical can capacitors, in particular round wound capacitors, consists of capacitor windings of equal size, in particular round capacitor windings which are delta-connected. Due to the installation of the capacitor windings in round capacitor cans, the capacitor windings are stacked on top of each other in a column. The delta connection makes it possible to interconnect the adjacent end-face contact layers (winding contact bridges), each forming a common terminal to a connection wire (external conductor), which may generally be a connecting conductor, for example, stranded wire. The third terminal results from the connection of the respective lowermost and uppermost end-face contact layers (winding contact bridges) of the capacitor winding column. This makes it technically very simple to work out the interior structure without requiring complex insulation between the adjacent end-face contact layers (winding contact bridges).

However, in certain aspects, a star connection would be advantageous in comparison with a delta connection. However, this is linked to the problem that at least one opposite end-face contact layer pair requires intermediate insulation. Due to this fact, the installation of the inner wiring is substantially more complex and time-consuming in comparison with the delta connection.

The object of the present invention is thus to provide a three-phase electrical can capacitor having plastic-film capacitor windings arranged in a housing in a column-like manner, each having the same capacitance, and having a simple or simpler structure.

According to the present invention, this object is achieved through a three-phase electrical can capacitor having three interconnected capacitances in one housing, wherein two plastic-film capacitor windings are stacked in a column-like manner in the housing, each having a hollow capacitor winding core and each being provided with an end-face contact layer on the end faces, wherein one of the two plastic-film capacitor windings has an individual capacitance and the other of the two plastic-film capacitor windings has two individual capacitances, and all individual capacitances are equal in magnitude.

According to one particular specific embodiment of the present invention, the two adjacent end-face contact layers of the two plastic-film capacitor windings are electrically connected to each other by a connecting wire. In particular, it may be provided that the connecting wire is connected to the two adjacent end-face contact layers by soldering.

Alternatively, the two adjacent end-face contact layers of the two plastic-film capacitor windings may be electrically connected to each other by a contact element situated between them, which is electrically connected to each of the two adjacent end-face contact layers without soldering. The contact element preferably comprises a preferably flat contact carrier, at least one contact piece extending essentially perpendicularly upwards from the contact carrier and at least one contact piece extending essentially perpendicularly downwards from the contact carrier, having at least one contact tip for establishing an electrical connection to each end-face contact layer by pressing the contact tip(s) into the same, and a penetration depth limitation means for limiting the penetration depth of the contact tip(s) into each end-face contact layer. The contact carrier is advantageously essentially annular. Multiple contact pieces are advantageously provided preferably equidistantly on the outer edge of the annular contact carrier and extend uniformly from it essentially perpendicularly upwards or downwards, and multiple contact pieces are provided preferably equidistantly on the inner edge of the annular contact carrier and extend uniformly from it in the opposite direction to the contact layers on the outer edge. The penetration depth limitation means advantageously has multiple support pieces having support surfaces or support points. In particular, it may be provided that the support pieces or a portion thereof are preferably provided equidistantly on the outer edge of the annular contact carrier and extend uniformly from it essentially perpendicularly upwards or downwards. The support pieces or a portion thereof are advantageously preferably provided equidistantly on the inner edge of the annular contact carrier and extend uniformly from it essentially upwards or downwards. The base material of the contact element should preferably be metal having good electrical conductivity, preferably brass or copper. In addition, it may be provided that the base material has a tin coating.

According to a particular specific embodiment, the contact element is preferably at least partially pressed into at least one of the two end-face contact layers.

According to another particular specific embodiment of the present invention, the plastic-film capacitor winding having the two individual capacitances is situated above the plastic-film capacitor winding having the individual capacitance, two connecting wires are electrically connected to the two individual capacitances via the upper end-face contact layer of the upper plastic-film capacitor winding, and a connecting wire extends from above downwards through the hollow capacitor winding cores and electrically connected to the lower end-face contact layer of the lower plastic-film capacitor winding.

Alternatively, it may be provided that the plastic-film capacitor winding having the individual capacitance is situated above the plastic-film capacitor winding having the two individual capacitances, two connecting wires extend from above downwards through the hollow capacitor winding cores and are electrically connected to the two individual capacitances via the lower end-face contact layer of the lower plastic-film capacitor winding, and a connecting wire is electrically connected to the upper end-face contact layer of the upper plastic-film capacitor winding.

Furthermore, it may be provided that the plastic-film capacitor winding having the two individual capacitances is wound from a plastic film having twice the width of the plastic film from which the plastic-film capacitor winding having the individual capacitance is wound, and is divided into the two individual capacitances by a wrapped separation film.

The plastic-film capacitor windings may be manufactured from plastic films provided with a metal layer, in particular metalized polypropylene films.

Finally, it may alternatively also be provided that the plastic-film capacitor windings are manufactured from metal films that are insulated from each other by a plastic film.

The present invention is based on the surprising discovery that because of the specific design and arrangement of the capacitor windings, only two stacked capacitor windings are required. The two individual capacitances of the one of the two capacitor windings are already electrically connected on one side by the end-face contact layers (winding bridge spraying). If, during assembly of the two capacitor windings into a column, the interconnected winding bridge is then connected to the winding bridge (end-face contact layer) of the other capacitor winding, the neutral point is thus already fully interconnected. This makes the internal interconnection significantly simpler. An additional insulation between the winding bridges is eliminated. This reduces material and manufacturing time when assembling the can capacitor.

Additional features and advantages of the present invention result from the included claims and the following description, in which three exemplary embodiments are explained in detail with the aid of the schematic drawings. The following are shown:

FIG. 1 shows a longitudinal sectional view of a three-phase electrical can capacitor according to one particular specific embodiment of the present invention in a manufacturing stage;

FIG. 2 shows a longitudinal sectional view of a three-phase electrical can capacitor according to another particular specific embodiment of the present invention in the same manufacturing stage;

FIG. 3 shows a longitudinal sectional view of a three-phase electrical can capacitor according to another particular specific embodiment of the present invention in the same manufacturing stage; and FIG. 4 shows a side view (above) and a plan view from above (below) of a contact element.

FIG. 1 shows a three-phase electrical can capacitor having three star-connected capacitances in one housing during manufacture, that is, still without any insulation caps, any sheath insulation, a housing, or a housing cover. Two plastic-film capacitor windings 10 and 12, each having a hollow capacitor winding core 14 and each being provided with an end-face contact layer 16 and 18 or 20 and 22 on the end faces, are stacked in a column-like manner. The two adjacent end-face contact layers 18 and 20 of the two plastic-film capacitor windings 10 and 12 are electrically connected to each other by a connecting wire 24 (neutral point) which is connected to the two adjacent end-face contact layers 18 and 20 by soldering. The upper plastic-film capacitor winding 10 has an individual capacitance and the lower plastic-film capacitor winding 12 has two individual capacitances. All individual capacitances are equal in magnitude. The plastic-film capacitor winding 12 having the two individual capacitances is wound from a plastic film having twice the width b of the plastic film from which the plastic-film capacitor winding 10 having the individual capacitance is wound, and is divided into the two individual capacitances by a wrapped separation film 26. Two connecting wires 28 and 30 extend from above downwards through the hollow capacitor winding cores 14 of the two plastic-film capacitor windings 10 and 12 and are electrically connected to the two individual capacitances via the lower end-face contact layer 22 of the lower plastic-film capacitor winding 12. A connecting wire 32 is electrically connected to the upper end-face contact layer 16 of the upper plastic-film capacitor winding 10.

Both plastic-film capacitor windings 10 and 12 are manufactured (wound) from a plastic film that is provided with a metal layer, in particular, metalized polypropylene film.

The specific embodiment shown in FIG. 2 differs from the one in FIG. 1 in that the order of the plastic-film capacitor windings 10 and 12 is reversed. The plastic-film capacitor winding 12 having the two individual capacitances is thus situated above the plastic-film capacitor winding 10 having the individual capacitance. In addition, two connecting wires 28 and 30 are electrically connected to the two individual capacitances via the upper end-face contact layer 20 of the upper plastic-film capacitor winding 12, and a connecting wire 32 extends from above downwards through the hollow capacitor winding cores 14 of the two plastic-film capacitor windings 10 and 12 and is electrically connected to the lower end-face contact layer 18 of the lower plastic-film capacitor winding 10.

The specific embodiment shown in FIG. 3 differs from the one in FIG. 2 in that a contact element 34 is provided instead of the connecting wire 24. The contact element 34 is electrically connected to each of the two adjacent end-face contact layers 22 and 16 without soldering. In addition, the contact element 34 is at least partially pressed into both end-face contact layers. The contact element 34 acts as a neutral point.

FIG. 4 illustrates the contact element 34 in a side view (above) and in a plan view from above (below). It has essentially annular flat contact carriers 36 and a connecting lug 38, which does not necessarily have to be present, extending inwardly from the contact carrier 36 in the same plane. On the outer edge, contact pieces 40, each having a contact tip 42, and support pieces 44 having support surfaces 46, of which only a few are labeled are arranged circumferentially and equidistantly in an alternating manner. Both the contact pieces 40 and the support pieces 44 extend perpendicularly downwards. On the inner edge, contact pieces 40 having contact tips 42 and support pieces 44 having support surfaces 46 are also provided, which extend perpendicularly upwards.

The features of the present invention disclosed in the above description, in the drawings, and in the claims may be essential, both individually and in any combination, for carrying out the present invention in its various specific embodiments.

LIST OF REFERENCE NUMBERS 10, 12 Plastic-film capacitor windings
14 Capacitor winding cores
16, 18, 20, 22 End-face contact layers
24 Connecting wire
26 Separation film
28, 30, 32 Connecting wires
34 Contact element
36 Contact carrier
38 Connecting tab
40 Contact pieces
42 Contact tips
44 Support pieces
46 Support surfaces

The invention claimed is:

1. A three-phase electrical can capacitor having three star-connected capacitances in one housing, wherein:
    two plastic-film capacitor windings (10, 12) are stacked in a column-like manner in the housing, each having a hollow capacitor winding core (14) and each being provided with an end-face contact layer (16, 18 or 20, 22) on the end faces;
    one (10) of the two plastic-film capacitor windings (10, 12) has an individual capacitance and the other (12) of the two plastic-film capacitor windings (10, 12) has two individual capacitances, and all individual capacitances are equal in magnitude and star-connected;

the plastic-film capacitor winding (12) having the two individual capacitances is situated above the plastic-film capacitor winding (10) having the individual capacitance, two connecting wires (28, 30) are electrically connected to the two individual capacitances via the upper end-face contact layer (20) of the upper plastic-film capacitor winding (12), and a connecting wire (32) extends from above downwards through the hollow capacitor winding cores (14) and is electrically connected to the lower end-face contact layer (18) of the lower plastic-film capacitor winding (10); and the two adjacent end-face contact layers (16, 22) of the two plastic-film capacitor windings (10, 12) are electrically connected to each other by a contact element (34) situated between them, which is electrically connected to each of the adjacent end-face contact layers (16, 22) without soldering.

2. The can capacitor as claimed in claim 1, characterized in that the contact element (34) is at least partially pressed into at least one of the two end-face contact layers (16, 22).

3. The can capacitor of claim 1, characterized in that the plastic-film capacitor winding (12) having the two individual capacitances is wound from a plastic film having twice the width b of the plastic film from which the plastic-film capacitor winding (10) having the individual capacitance is wound, and is divided into the two individual capacitances by a wrapped separation film (26).

4. The can capacitor of claim 1, characterized in that the plastic-film capacitor windings (10, 12) are manufactured from plastic films provided with a metal layer, in particular metalized polypropylene films.

5. The can capacitor of claim 1, characterized in that the plastic-film capacitor windings (10, 12) are manufactured from metal films that are insulated from each other by a plastic film.

6. A three-phase electrical can capacitor having three star-connected capacitances in one housing, wherein:

two plastic-film capacitor windings (10, 12) are stacked in a column-like manner in the housing, each having a hollow capacitor winding core (14) and each being provided with an end-face contact layer (16, 18 or 20, 22) on the end faces;

one (10) of the two plastic-film capacitor windings (10, 12) has an individual capacitance and the other (12) of the two plastic-film capacitor windings (10, 12) has two individual capacitances, and all individual capacitances are equal in magnitude and star-connected; and the plastic-film capacitor winding (10) having the individual capacitance is situated above the plastic-film capacitor winding (12) having the two individual capacitances, two connecting wires (28, 30) extend from above downwards through the hollow capacitor winding cores (14) and are electrically connected to the two individual capacitances via the lower end-face contact layer (22) of the lower plastic-film capacitor winding (12), and a connecting wire (32) is electrically connected to the upper end-face contact layer (16) of the upper plastic-film capacitor winding (10).

7. The can capacitor as claimed in claim 6, characterized in that the two adjacent end-face contact layers (18, 20 or 16, 22) of the two plastic-film capacitor windings (10, 12) are electrically connected to each other by a connecting wire (24).

8. The can capacitor as claimed in claim 7, characterized in that the connecting wire (24) is connected to the two adjacent end-face contact layers (18, 20 or 16, 22) by soldering.

9. The can capacitor as claimed in claim 6, characterized in that the two adjacent end-face contact layers (16, 22) of the two plastic-film capacitor windings (10, 12) are electrically connected to each other by a contact element (34) situated between them, which is electrically connected to each of the adjacent end-face contact layers (16, 22) without soldering.

10. The can capacitor as claimed in claim 9, characterized in that the contact element (34) is at least partially pressed into at least one of the two end-face contact layers (16, 22).

11. The can capacitor of claim 6, characterized in that the plastic-film capacitor winding (12) having the two individual capacitances is wound from a plastic film having twice the width b of the plastic film from which the plastic-film capacitor winding (10) having the individual capacitance is wound, and is divided into the two individual capacitances by a wrapped separation film (26).

12. The can capacitor of claim 6, characterized in that the plastic-film capacitor windings (10, 12) are manufactured from plastic films provided with a metal layer, in particular metalized polypropylene films.

13. The can capacitor of claim 6, characterized in that the plastic-film capacitor windings (10, 12) are manufactured from metal films that are insulated from each other by a plastic film.

* * * * *